Oct. 3, 1950 W. E. BRADLEY 2,524,251

PULSE-MODULATION SYSTEM

Filed Oct. 26, 1948

INVENTOR.
WILLIAM E. BRADLEY
BY
Brown, Denk & Synnestvedt
AGENTS

Patented Oct. 3, 1950

2,524,251

UNITED STATES PATENT OFFICE 2,524,251

PULSE-MODULATION SYSTEM

William E. Bradley, Springfield, Pa., assignor to Philco Corporation, Philadelphia, Pa., a corporation of Pennsylvania Application October 26, 1948, Serial No. 56,531

12 Claims. (Cl. 250—6)

Figure 1:
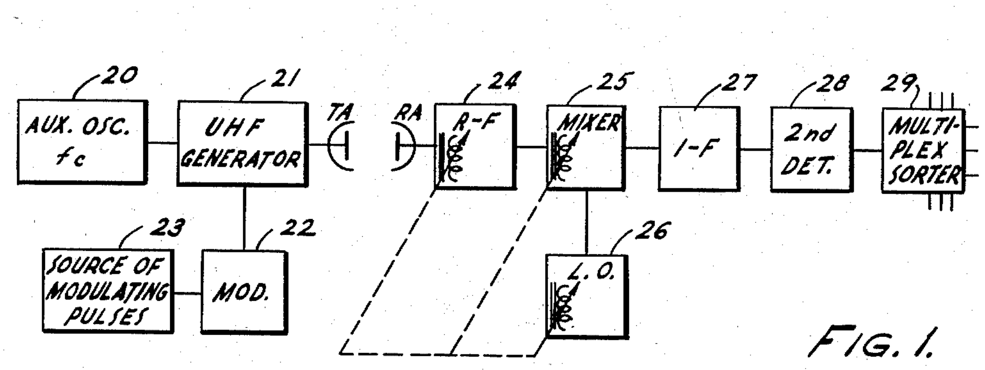

The invention herein described and claimed relates to an improvement in electrical signalling systems which utilize pulses of carrier energy.

The present invention may be employed to particular advantage in pulse-modulation communication systems to achieve a substantial improvement in the effective use of the bandwidth, or, alternatively, to achieve a substantial reduction in the bandwidth required.

It is well known that pulse communication, in its present state of development, does not utilize a given bandwidth as efficiently as does continuous wave transmission. For example, it is generally recognized that pulse-time modulation fails to achieve, by a factor of four to one, the economy of bandwidth which is characteristic of the modulated continuous wave.

The poor bandwidth economy of pulse communication systems results from the fact that, when the bandwidth of the system is restricted, the transmitted pulses are not actually of the ideally rectangular waveform usually depicted, but are, on the contrary, more or less rounded. This is due to the filtering action of the selective circuits employed to define the bandwidth of the system. Because of the limitation of bandwidth, the selective circuits ordinarily have a relatively high Q-factor and, when the modulating pulse is removed, the circuits tend to oscillate or ring for a period of time which is large in comparison with the time duration of the useful portion of the pulse. The waveform of the pulse is, therefore, characterized by a trailing portion or tail of substantially sine waveform. If pulses be transmitted in such rapid succession that the trailing or ringing portion of one pulse is of appreciable magnitude at the time the succeeding pulse occurs, the succeeding pulse will appear to the detector of the receiver as a signal which is the composite or summation of the carrier energies in the overlapping portions of consecutive pulses, and the original intelligence becomes distorted. This is particularly objectionable in multiplex systems, for in such systems the distortion due to interference between successive pulses appears as crosstalk, successive pulses being associated with independent messages.

Heretofore, crosstalk has ordinarily been minimized by so spacing the transmitted pulses that the ringing portion or tail of a preceding pulse has decayed to a magnitude commensurate with the interference tolerances before the following pulse is transmitted. The relatively wide pulse-spacing, which is necessary in order to overcome the objectionable effects of the pulse tails, reduces the number of pulses that may be transmitted in a given time, and, hence, reduces the number of message units or message channels in the system.

It will be understood that the magnitude of the composite signal mentioned above (resulting from the overlapping of portions of successive pulse signals) depends upon the relative phases of the overlapping carrier-frequency energy, being a maximum when the carriers are in phase and a minimum when they are in phase opposition. Consequently, in a pulse-time-modulation system, if no fixed phase relation be maintained between the carrier energy in the overlapping portions of successive pulses, the minimum pulse-spacing must be sufficiently large to keep crosstalk within tolerances when the overlapping carrier energies are in phase, this being the most unfavorable or limiting condition.

In accordance with my invention, means are provided whereby the carrier energy in the trailing portion of a preceding pulse is arranged to be in time-quadrature with the carrier energy in the useful portion of the succeeding pulse when such succeeding pulse occurs at a predetermined interval after the preceding pulse. In pulse-time-modulation systems, the predetermined interval will ordinarily be the minimum spacing interval.

The improvement derived from my invention is substantial, the interference or crosstalk being a whole order of magnitude less than that obtaining in conventional pulse communication systems. If desired, in lieu of reducing crosstalk, the pulses may be spaced more closely so that, for crosstalk tolerances not greater than those of prior art systems, the improved system of the present invention may comprise an increased number of message channels or message units. Or, with pulse spacings and interference tolerances substantially the same as those of present systems, the pulse system employing the present invention would not require as wide a bandwidth.

In a preferred form of the invention, the time-quadrature relation between the carrier energy in the overlapping portions of successive pulses is obtained by employing in an otherwise conventional pulse-modulation system, (*a*) a coherent type of pulse transmitter, which is a transmitter adapted to emit pulses of carrier-frequency energy whose phase corresponds to that of sampled portions of a continuous wave, the sampling being coincident with the occurrence of the pulse, and (*b*) a bandpass system whose overall frequency characteristics, both as to amplitude and phase, are symmetrical about a frequency which is different from, but bears a special relation to, the cohering frequency of the transmitter. During the time of the pulse proper, the carrier frequency in the system is that of the cohering frequency of the transmitter, while during the ringing portions of the pulse, the carrier frequency in the system is that determined by the frequency to which the bandpass system is tuned.

In accordance with a preferred form of my invention, the bandpass system of the overall pulse-modulation system is so tuned that its center-frequency differs from the cohering frequency of the transmitter by such an amount that a frequency of that amount would undergo one quarter-cycle (or other small odd number of quarter-cycles) of oscillation in a time-period equal to a predetermined time-separation between pulses. Then, at the second detector of the receiver, the overlapping carrier-frequency energies of the succeeding pulse (occurring at the predetermined time) and of the ringing portion of the preceding pulse will be substantially in phase-quadrature.

In a pulse-time-modulation system, the predetermined time-separation referred to above is preferably equal to the minimum time-separation between successive pulses. For, the crosstalk which tends to occur at the wider pulse spacings is less than that which tends to occur at minimum spacing due to the inherent decay in the pulse-tail energy.

It is an object then of this invention to provide, in a pulse-modulation communication system, means for minimizing the adverse effects of the ringing or trailing portions of the pulses, whereby a reduction may be effected in the interference or crosstalk experienced, and/or in the bandwidth required, and/or an improvement may be effected in the bandwidth efficiency.

Figure 4:
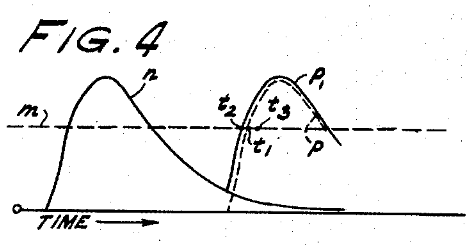
Figure 5:
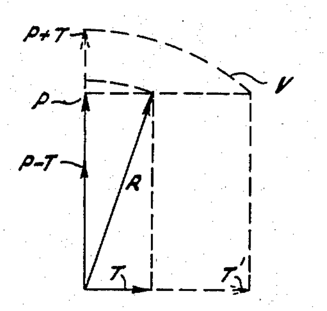
Figure 6:
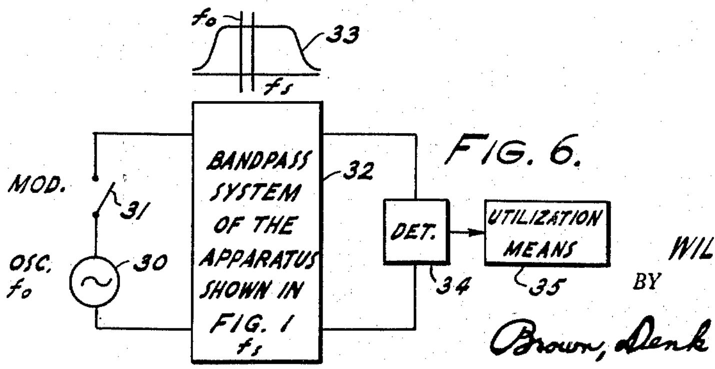

The above, as well as other objects and advantages of the present invention will become clear from the following detailed description taken in conjunction with the accompanying drawing in which:

Figure 1 is a diagrammatic representation of a portion of a multiplex pulse-modulation system embodying a preferred embodiment of the present invention, Figures 2, 3, 4 and 5 are graphical illustrations which will be helpful in explaining the invention, and Figure 6 is a simplified diagram of a pulse-modulation system similar to that illustrated in Figure 1.

Referring now to Figure 1, there is shown schematically a portion of a multiplex pulse-modulation communication system embodying the present invention. With the exception of auxiliary oscillator 20, whose function will be explained subsequently, the components shown in Figure 1 are similar to those found in conventional multiplex pulse-modulation systems. The transmitter portion of the system includes the source of modulating pulses 23, the modulator 22, the ultrahigh frequency generator 21, and the antenna TA. The ultrahigh-frequency generator 21 may be any suitable device, as, for example, a magnetron, which is rendered operative only at the times that pulses are supplied thereto from source 23. Source 23 and modulator 22 may be comprised of apparatus commonly employed for deriving modulating pulses from the intelligence signals intended to be transmitted. The type of modulation employed may be either pulse-position, pulse-width, pulse-amplitude, or other suitable form of pulse modulation.

The receiver portion of the system shown in Figure 1 includes the receiving antenna RA and a conventional superheterodyne receiver comprised of R.-F. circuit 24, mixer 25, local oscillator 26, I.-F. amplifier 27 and second detector 28. Multiplex sorter 29 is employed for segregating the pulses into their respective channels for demodulation. If desired, the demodulation means may be included in the multiplex sorter 29. The receiver includes, of course, suitable tuning means. In Figure 1, the tuning means is represented as comprising ganged permeability tuning means in the R.-F., mixer and local oscillator stages.

In accordance with the present invention, a coherent type of transmitter is employed to establish and maintain the phase of the carrier energy during the time the pulses derived from source 23 are transmitted. Stated another way, the present invention employs a coherent transmitter whereby the phase of the carrier-frequency energy in each transmitted pulse is such as to correspond to that of a sampled portion of a continuous constant-frequency wave, assuming sampling to be coincident with the occurrence of the pulses. The conventional transmitter (comprising components 21, 22 and 23, heretofore described) is readily converted into a coherent type of transmitter by the addition of a constant-frequency, continuously-oscillating, auxiliary oscillator 20 suitably coupled to the U. H. F. generator 21. When the U. H. F. generator 21 comprises a magnetron, the auxiliary oscillator 20 may feed the tank circuit of the magnetron through a buffer stage (not shown).

For a better understanding of the invention, I will first describe, with the aid of Figures 2 to 5, the manner in which the relatively high Q selective circuits, ordinarily required to be employed in a multiplex pulse-modulation system, limit the minimum spacing permissible between two consecutive pulses.

Figure 2:
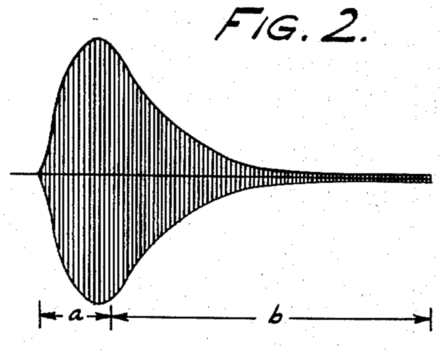

In Figure 2 there is shown the general waveform of the carrier energy in a single transmitted pulse. Portion *a* represents that part of the transmitted pulse which corresponds to the modulating pulse. For convenience, portion *a* may be referred to as the main pulse. Portion *b*, represents the tail or trailing portion of the main pulse caused by the ringing of the tuned circuits. Thus, the upper half of the envelope, indicated by the heavier outline, illustrates the waveform of the output of the second detector 28 derived from a single pulse.

Figure 3:
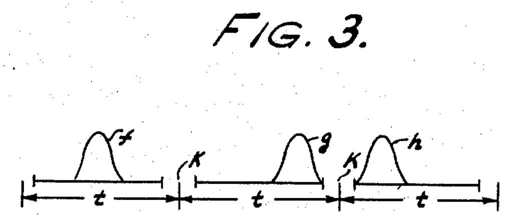

Assume, to facilitate this description, that Figure 1 represents a portion of a pulse-time-modulation system. In a pulse-time-modulation system, a series of short pulses are transmitted in sequence; each of the pulses of the series represents a sampled portion of a different signal wave, and the sequential series is repeated many times per second. In Figure 3, each pulse of the sequential series is shown to occupy a time domain *t* whose duration is determined by the number of pulses in the series and the repetition rate of the series. In the absence of modulation, a pulse occurs at the center of its domain. Pulse *f* represents such an unmodulated pulse. The modulating signal modifies the position, or time of occurrence, of the pulse within its domain, a given polarity of modulating signal causing a later occurrence (represented by pulse *g*), and the opposite polarity of modulating signal causing an earlier occurrence (represented by pulse *h*).

The pulses shown in Figure 3 are main pulses, the tail or ringing portions not being shown. In practice, however, the ringing of the selective circuits produces a tail portion and makes it necessary to provide an adequate time-interval or guard-domain *k* between pulses of minimum separation. Such pulses are represented in Figure 3 by *g* and *h* which correspond to modulation signals of maximum amplitudes and opposite polarities.

In the process of recovering the intelligence from the time-modulated pulses, the detected pulses are ordinarily sorted into separate channels, as by means of the multiplex sorter 29. The modulating signal in each channel may be obtained by developing a voltage proportional to the time, measured from the beginning of the domain, required for the pulse to rise to a predetermined amplitude, which, in practice, is ordinarily a fraction of its total amplitude. With an ideally rectangular pulse, the receiver would be adapted to respond, for example, to the leading edge; and, since all points on the sharply rising leading edge would correspond substantially to the time-position of the modulating signal, the presence of other signals would have no appreciable effect upon the recovered intelligence. However, when a rounded pulse is received, there is no vertical edge to establish the time-position of the pulse, and the time of occurrence of the predetermined amplitude, referred to above, is affected by the presence of other signals.

The above is clearly brought out in Figure 4 where the dotted-line $m$ indicates the predetermined pulse amplitude to which the receiver responds, and which establishes, in the demodulating circuit, the time-position of the pulse. In the absence of a preceding pulse $n$, the critical amplitude of the succeeding pulse $p$ would occur at time $t_1$, which corresponds to the time-position of the pulse. However, the presence of the tail of preceding pulse $n$ will cause pulse $p$ to reach amplitude $m$ at an earlier time, $t_2$, or a later time, $t_3$, depending upon whether the carrier energy in pulse $p$ is in phase or is in phase-opposition, respectively, with the carrier energy in the trailing portion of pulse $n$. When the two carrier energies referred to are in phase, the resulting signal impressed upon the second detector 28 is the arithmetic sum of the pulse voltages; and when the two carrier energies are oppositely phased, the resulting signal is the arithmetic difference of the pulse voltages. When the two carrier energies are in time-quadrature, or approximately so, the composite signal corresponds to their vector sum and has a magnitude more nearly equal to that of pulse $p$ than has the composite signal of either the in-phase or the phase-opposition conditions.

In Figure 5, the relative magnitudes of the resultant signals for the three phase conditions mentioned above are shown diagrammatically. The vector P represents the magnitude of the voltage of a main pulse $p$, and the vector T represents the magnitude of the voltage in the trailing portion of a preceding pulse $n$, both at the time $t_1$ in Figure 4. The vector R represents the magnitude of the resultant of vectors P and T when P and T are in phase-quadrature. The vector P+T represents the magnitude of the resultant when P and T are in phase; and the vector $P-T$ represents the magnitude of the resultant when they are in phase-opposition. It is evident from Figure 5 that the magnitude of vector R is more nearly equal that of vector P than is the magnitude of either of the vectors $P+T$ or $P-T$.

It is also evident from Figure 5 (see the dotted-line arc V) that, with the carriers in phase-quadrature, the voltage in the tail portion of pulse $n$ may be of substantially larger magnitude, as indicated by the vetcor T', and yet result in a composite signal amplitude no greater than that produced by the smaller voltage T when the carrier energy in the tail portion of pulse $n$ is in phase with the carrier energy in $p$.

The concept of the present invention may be summarized with the aid of the simplified diagram shown in Figure 6. The diagram there shown includes all of the essential elements of a pulse-modulation communication system embodying the invention. In Figure 6, oscillator 30 is in continuous oscillation at a constant frequency $f_o$. The output of oscillator 30 is pulse modulated by means of the modulator switch 31. These two elements, oscillator 30 and modulator 31, simulate a coherent type of transmitter, such as is employed in the system of Figure 1 and there shown to comprise the continuously-oscillating, constant-frequency, auxiliary oscillator 20, the U. H. F. generator 21, and the modulating elements 22 and 23. In the simplified diagram of Figure 6, the selective circuits of the entire system of Figure 1, both transmitting and receiving, and including the space link, are included in block 32, identified as the bandpass system. The frequency response characteristic of the bandpass system 32 is symmetrical about a frequency $f_s$ which differs from the oscillator frequency $f_o$, by a predetermined amount, as is indicated by the graph 33. The output of the bandpass system 32 is applied to the second detector 34 of the receiver, and the detected signal is applied to a suitable signal utilization means 35. During the time that switch 31 is closed, the frequency of the wave energy impressed upon detector 34 is that of oscillator 30, $f_o$. However, when switch 31 is opened, the bandpass system 32 rings at its own natural frequency $f_s$, and wave energy of frequency $f_s$ is impressed upon detector 34. Consequently, if the bandpass system 32 be so aligned that the center frequency $f_s$ differs from the oscillator frequency $f_o$ by such an amount that a frequency equal to the difference-frequency would undergo an odd number of quarter-cycles during the time that switch 31 is open, then when switch 31 is again closed, the two waves of energy which are impressed upon detector 34 will be in phase-quadrature, and the interference between the two signals will be minimum. A minimum of distortion or interference will then be present in the output of detector 34.

For best results, the overall bandpass system, including both the transmitter and receiver portions thereof, should be so detuned from the cohering frequency of the transmitter (as determined by the continuously-oscillating oscillator) that a frequency equal to the difference therebetween would undergo one quarter-cycle (or a small odd number of quarter-cycles) in a period of time equal to that of the minimum spacing between pulses. A substantial improvement over prior art systems may, however, be obtained by detuning either one (as distinguished from both) of the transmitting and receiving portions of the bandpass system. In practice, a convenient way of obtaining an approximation of the optimum condition desired, whereby the phase relationship between the carrier energies in a main pulse and in the tail portion of a preceding pulse approach a phase-quadrature condition, is to adjust the tuning of the receiver for minimum crosstalk. By so doing, the system approximates the desired condition.

While the present invention may be employed to advantage in a pulse-time-modulation system, as has been described, or in a pulse-width-modulation system, it may be employed to particular advantage in a pulse-amplitude-modulation system, for in a pulse-amplitude-modulation system the pulses are at fixed separation, Having described my invention, I claim:

1. A pulse-modulation system comprising a pulse transmitter and a receiver to receive pulses transmitted thereby, said transmitter including modulating means whereby the transmitted pulses are modulated in accordance with intelligence signals supplied to said modulating means, said modulated pulses having a predetermined minimum spacing, said transmitter also including a source of continuous wave of predetermined fixed frequency establishing the frequency and phase of the carrier-frequency energy in said transmitted pulses, the tuned circuits and elements of the overall carrier frequency bandpass system of said pulse-modulation system being so adjusted that, in response to the application of a pulse, said bandpass system rings at a carrier frequency which is different from the said fixed frequency of said continuous-wave source but which is so related thereto that a wave having a frequency equal to the difference therebetween would undergo a small odd number of quarter-cycles in a time-period equal to the minimum time-interval between pulses.

2. A pulse-modulation system as claimed in claim 1 characterized in that the said small odd number of quarter-cycles is one quarter-cycle.

3. A pulse-modulation system as claimed in claim 2 characterized in that said overall carrier-frequency bandpass system has a frequency-response characteristic which is substantially symmetrical and in that said frequency at which said bandpass system rings is located at substantially the center of symmetry.

4. A pulse-modulation system as claimed in claim 1 characterized in that said overall carrier-frequency bandpass system has a frequency-response characteristic which is substantially symmetrical and in that said frequency at which said bandpass system rings is located at substantially the center of symmetry.

5. A pulse-modulation system having a pulse transmitter locked, in frequency and in phase, by a coherent oscillator, thereby establishing the frequency and phase of the carrier-frequency energy in the transmitted pulses, said transmitter including modulating means whereby the transmitted pulses are modulated in accordance with intelligence signals supplied to said modulating means, said modulated pulses having a predetermined minimum spacing, said pulse-modulation system also having a receiver to receive the transmitted pulses, the tuned circuits and elements of the carrier-frequency bandpass system of at least one of said transmitter and said receiver being so adjusted that, in response to an applied pulse, said bandpass system rings at a frequency which differs from the said established frequency of the energy in the transmitted pulses but which is so related thereto that a wave whose frequency is equal to the difference therebetween would undergo a small odd number of quarter-cycles in a time-period equal to the minimum time-interval between pulses, whereby due to the natural resonance of said bandpass system there is produced from each applied pulse an oscillating wave, said oscillating wave having a substantially phase-quadrature relation to the carrier-frequency energy in a succeeding pulse when said succeeding pulse is spaced from the immediately preceding pulse by said minimum time-interval.

6. A pulse-modulation system as claimed in claim 5 characterized in that the said small odd number of quarter-cycles is one quarter-cycle.

7. A pulse-modulation system as claimed in claim 6 characterized in that said bandpass system has a frequency-response characteristic which is substantially symmetrical and in that said frequency at which said bandpass system rings is located at substantially the center of symmetry.

8. A pulse-modulation system as claimed in claim 5 characterized in that said bandpass system has a frequency-response characteristic which is substantially symmetrical and in that said frequency at which said bandpass system rings is located at substantially the center of symmetry.

9. A pulse-modulation system having a pulse transmitter locked by a source of continuous wave to a predetermined substantially fixed frequency, thereby establishing the frequency and phase of the carrier-frequency energy in the transmitted pulses, said transmitter including modulating means whereby the transmitted pulses are modulated in accordance with intelligence signals supplied to said modulating means, said modulated pulses having a predetermined minimum spacing, said pulse-modulation system also having a receiver to receive the transmitted pulses, the tuned circuits and elements of the carrier-frequency bandpass system of said receiver being so adjusted that, in response to an applied pulse, said bandpass system rings at a frequency which differs from the said established frequency of said transmitted pulse energy but which is so related thereto that a wave whose frequency is equal to the difference therebetween would undergo a small odd number of quarter-cycles in a time-period equal to the minimum time-interval between pulses, whereby due to the natural resonance of said bandpass system there is produced from each applied pulse an oscillating wave, said oscillating wave having a substantially phase-quadrature relation to the carrier-frequency energy in a succeeding pulse when said succeeding pulse is spaced from the immediately preceding pulse by said minimum time-interval.

10. A pulse-modulation system as claimed in claim 9 characterized in that the said small odd number of quarter-cycles is one quarter-cycle.

11. A pulse-modulation system as claimed in claim 10 characterized in that said bandpass system has a frequency-response characteristic which is substantially symmetrical and in that said frequency at which said bandpass system rings is located at substantially the center of symmetry.

12. A pulse-modulation system as claimed in claim 9 characterized in that said bandpass system has a frequency-response characteristic which is substantially symmetrical and in that said frequency at which said bandpass system rings is located at substantially the center of symmetry.

WILLIAM E. BRADLEY.

REFERENCES CITED

The following references are of record in the file of this patent:

UNITED STATES PATENTS

| Number | Name | Date |
|---|---|---|
| 2,176,218 | Klutke | Oct. 17, 1939 |
| 2,406,019 | Labin | Aug. 20, 1946 |
| 2,416,286 | Busignies | Feb. 25, 1947 |
| 2,425,314 | Hansell | Aug. 12, 1947 |
| 2,433,442 | Dodds | Dec. 30, 1947 |